United States Patent [19]

Zobel et al.

[11] Patent Number: 4,815,833

[45] Date of Patent: Mar. 28, 1989

[54] OBJECTIVE FOR ENDOSCOPES AND PROCESS FOR ITS PRODUCTION

[75] Inventors: Jürgen Zobel, Bretten-Sprantal; Siegfried Karst, Eisinger; Rolf Zickwolf, Bretten-Rinklingen; Wilfried Uhrich, Oberderdingen, all of Fed. Rep. of Germany

[73] Assignee: Richard Wolf GmbH, Fed. Rep. of Germany

[21] Appl. No.: 123,545

[22] Filed: Nov. 20, 1987

[30] Foreign Application Priority Data

Nov. 25, 1986 [DE] Fed. Rep. of Germany ....... 3640186

[51] Int. Cl.$^4$ .................... G02B 17/00; G02B 23/26
[52] U.S. Cl. ................................. 350/445; 350/286; 350/417
[58] Field of Search ............... 350/445, 286, 417

[56] References Cited

U.S. PATENT DOCUMENTS 4,684,224  8/1987  Yamashita et al. ................. 350/445

*Primary Examiner*—John K. Corbin
*Assistant Examiner*—Rebecca D. Gass
*Attorney, Agent, or Firm*—Hill, Van Santen, Steadman & Simpson

[57] ABSTRACT

An objective for endoscopes with a lateral objective lens comprises an elongated prism having a convex proximal end surface and a distal end on which are joined by cementing after alignment on an optical axis, a diaphragm, a negative lens and optionally a wedge-shaped support, to form an indissoluble unit. The lens, the diaphragm and the support if present are provided with sections protruding radially beyond a desired periphery of the objective, which sections are ground off together to the dimension of the prism circumference, so that a rod-shaped objective unit is formed.

10 Claims, 2 Drawing Sheets

OBJECTIVE FOR ENDOSCOPES AND PROCESS FOR ITS PRODUCTION

BACKGROUND OF THE INVENTION

1. Field of the Invention

The invention relates to an objective for endoscopes, in particular for endoscopes having a lateral objective lens, consisting essentially of at least a prism, a diaphragm and a negative lens forming the distal delimitation of the objective, the prism being provided with reflective surfaces and the negative lens as well as the diaphragm being joined together and being situate on the same axis. The invention furthermore relates to a process for the production of objectives for endoscopes of this type.

2. Description of the Prior Art

Known objectives for endoscopes generally comprise a rod-shaped prism installed in a metal mounting and a diaphragm with a negative lens positioned at the distal end beyond the prism. It is necessary in this connection, in order to obtain the desired optical qualities such as direction of view, angle of view, resolution and sharpness as far as the edge of the image field, to maintain extremely close tolerances and eccentricities of the mutually aligned axes during production and assembly. To accomplish this, the diameter of such objectives could not be smaller than about 2.7 mms, although even smaller diameters are required in practice.

SUMMARY OF THE INVENTION

It is accordingly an object of the invention to provide an improved structure for objectives for endoscopes, in particular for endoscopes having a lateral objective lens, such that, with the same optical quality as in the case of known objectives, it is possible to produce objectives and optical systems having a diameter smaller than 2.7 mms, and preferably substantially smaller. The objectives are made so that substantial resetting jobs are rendered unnecessary during subsequent repairs and replacement of the objective.

This object is achieved in accordance with the invention, in an objective of the type described above, in that at least the prism, the diaphragm and the negative lens, as well as any support member which may be inserted between the prism and the diaphragm, are non-releasably joined together and jointly form an optically unalterable unit.

A wedge-shaped support member is preferably arranged between the rod-shaped prism and the diaphragm.

Thanks to the aforesaid structure in accordance with the invention, it is possible above all to simplify its production substantially and to allow the objective to be produced with a small diameter. The diaphragm and the negative lens can be produced with a radial oversize relative to the subsequent outline of the finished objective, and then ground to the desired shape and diameter. The diaphragm is preferably joined direct to the prism under an optical alignment with the latter and with the insertion of a separate support member if required. The negative lens is thereupon joined to the diaphragm under an optical alignment with the prism and/or the diaphragm, and the objective is completed and formed into a rod by removing the parts of the diaphragm, the negative lens and the support member if used which project radially because of the oversize dimensions, in one grinding operation.

Further objects and advantages of the invention will become apparent from the following detailed description taken in conjunction with the accompanying drawings which illustrate preferred embodiment thereof.

DETAILED DESCRIPTION OF THE PREFERRED EMBODIMENTS

Figure 5:
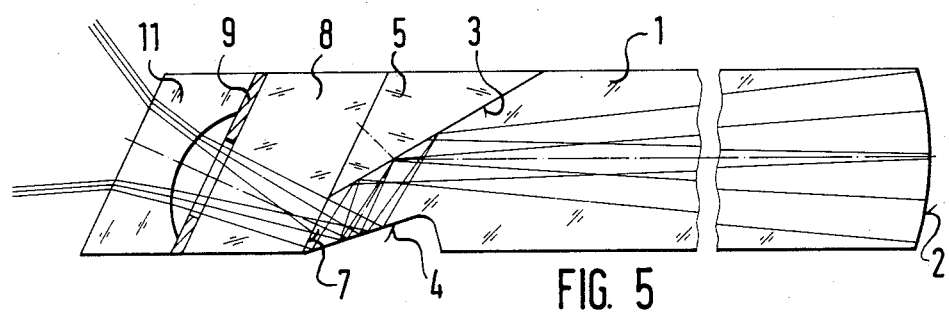
FIGS. 5 and 6 are side views of two embodiments of completed objectives according to the invention with the beam path of the object which is to be observed.

The objective illustrated in FIG. 5 is formed as an indissolubly joined unit with a lateral objective lens, comprises a rod-shaped prism 1 its cylindrical part preferably having a length which is equal to at least twice the diameter of the prism. The prism 1 is provided with a convex surface 2 at the proximal end and with an oblique chamfer 3 and a ground surface 4 at the distal end. These two surfaces 3 and 4 form reflective surfaces and are provided with a reflective coating.

Figure 1:
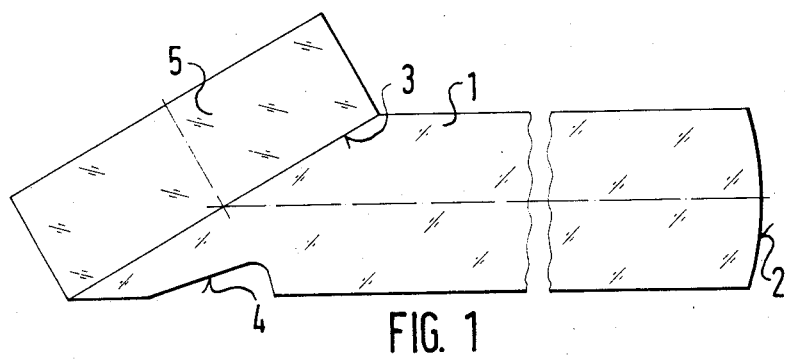
FIGS. 1 to 4 are side views showing consecutive production stages for an objective according to the invention.
Figure 2:
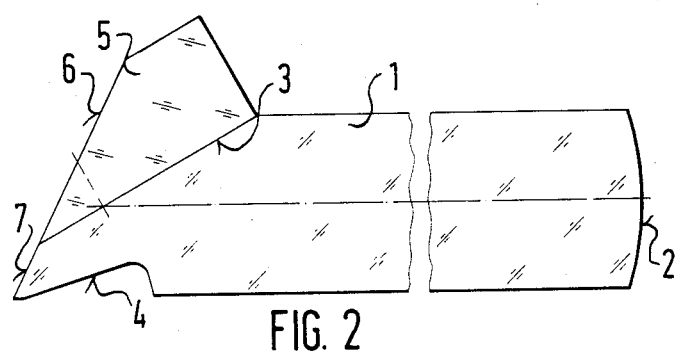

During the production of the objective shown in FIG. 5, a support member 5 having the reflective surface is cemented to the prism 1 as shown in FIG. 1. The support member is then cut to a wedge shape with a ground surface 6, as shown in FIG. 2. The distal end of the prism is cut at the same time to form a surface 7, coplanar with surface 6, for the passage of light from the lens.

Figure 3:
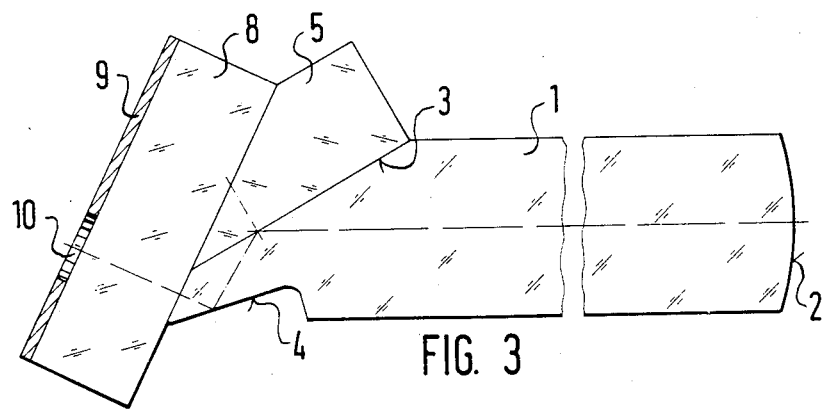

A diaphragm comprising a small glass plate or block 8 bearing a black metal coating a, which is applied by vapour deposition and has a diaphragm aperture 10, is joined indissolubly to the surfaces 6,7 by cementing. This is shown in FIG. 3.

Figure 4:
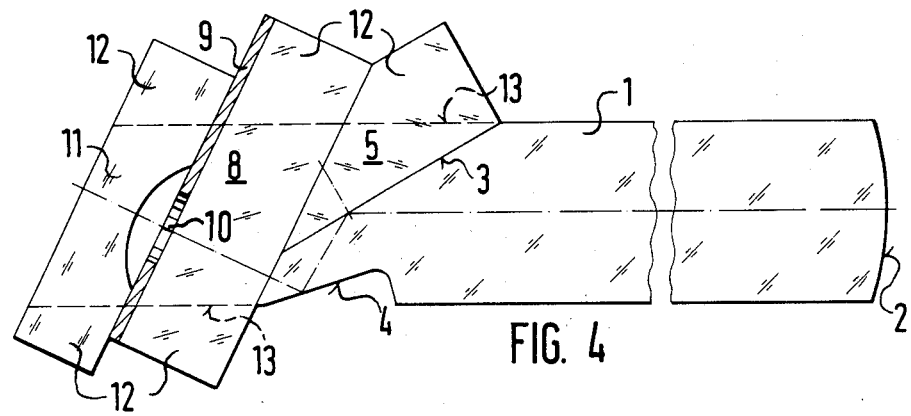

The negative lens 11 is finally cemented to the diaphragm 8,9,10 as shown in FIG. 4. The individual parts 5,8 and 11 cemented to the prism 1 to form an indissoluble unit have delimiting surfaces extending perpendicularly to each other in their initial form, in such manner that parts 12 which protrude beyond the desired eventual extension of the prism circumference, shown by dashed lines 13 (FIG. 4), are finally ground off, so that an objective lens is produced as shown in FIG. 5. During this production of the objective, the individual parts may easily be mutually aligned during the cementing operation thanks to their dimensions and initial shapes, under visual observation, to which end the periphery of the comparatively long prism 1 is utilised as a datum surface after finally grinding off the protruding surplus sections 12, so that a homogenous transition-less jacket surface of the cylindrical endoscope objective is obtained. In this connection, the peripheral surface of the prism 1 also serves the purpose of alignment upon installing the objective in an optics tube of endoscope.

Figure 6:
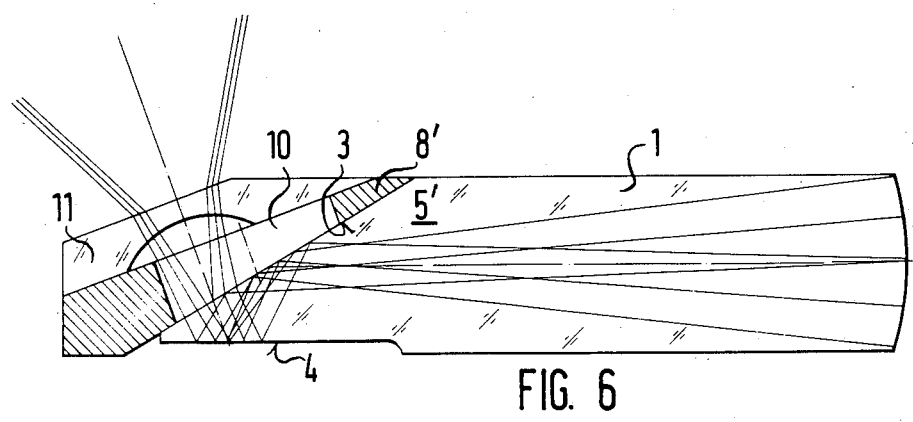

The objective shown in FIG. 6 differs from that of FIG. 5 in that instead of a separate wedge-shaped support for the diaphragm a wedge-shaped annular diaphragm 8', suitably made from metal or opague glass, is cemented directly to an obliquely cut surface 3 of the distal end portion 5' of the prism 1. As in the embodiment of FIG. 5, a ground surface 4 is formed immediately behind the prism and is provided with a reflective coating. In this case, the surface 4 is parallel to the axis of the prism, to receive and reflect an image beam the axis of which is at a larger angle relative to the prism axis than in the embodiment of FIG. 5.

A negative lens 11 is cemented to the distal side of the diaphragm 8'. The image beam from the lens passes through a central opening 10 of the diaphragm and through the surface 3 which in this embodiment does not have a reflective coating. The beam then strikes the surface 4 and is reflected back to the surface 3. This time however the angle of incidence is so large that total internal reflection takes place and the image beam is projected along the axis of the prism. As in the embodiment of FIG. 5, this objective is formed as an unalterable integral unit.

What is claimed is:

1. An objective for an endoscope comprising:
   a prism having proximal and distal ends and having at least one reflective surface;
   a diaphragm at said distal end of the prism and
   a negative lens on the distal side of said diaphragm, wherein said prism, said diaphragm and said lens are interconnected on the same axis and are inseparably joined together to form an unalterable unit.

2. An objective as claimed in claim 1, further comprising a support member in the shape of a wedge installed between a reflective distal end surface of the prism and the diaphragm, a distal surface of said support member forming a support for the diaphragm.

3. An objective as claimed in claim 2 wherein said diaphragm comprises a glass block with a metal coating with an aperture therethrough.

4. An objective as claimed in claim 1 wherein said diaphragm comprises a wedge-shaped annular member between said lens and an obliquely-angled distal end surface of said prism.

5. An objective as claimed in claim 1 wherein said prism is in the form of a rod-shaped element.

6. An objective as claimed in claim 5 wherein said rod-shaped element of the prism has a length equal to at least twice its diameter.

7. A method of making an endoscope objective, said method comprising the steps of aligning on an optical axis a rod-shaped prism, a diaphragm and a negative lens, said diaphragm and said lens each having portions extending radially, relative to said axis, beyond a desired radial periphery for said objective, securing said diaphragm to a distal end of said prism and securing said lens to the distal side of said diaphragm and, in a single grinding operation, removing said radially extending portions of the diaphragm and the lens to produce a rod-shaped objective having the desired radius.

8. A method as claimed in claim 7 wherein a separate support member is inserted and secured between part of said prism and said diaphragm.

9. A method as claimed in claim 8 wherein said support member also has a portion extending radially beyond said desired periphery, which portion is removed by said grinding operation.

10. A method according to claim 7, which prior to the aligning of the prism, diaphragm and negative lens, securing a support member on the distal end of the prism, then cutting the support member and a portion of the distal end of the prison to form a wedge shape for the support member and to form ground coplanar surfaces for the prism and support member for receiving the diaphragm.

* * * * *